Sept. 3, 1968 H. A. GRANT 3,400,279

VOLTAGE LEVEL SENSING CIRCUIT

Filed Sept. 3, 1965 2 Sheets-Sheet 1

*INVENTOR*
H. A. GRANT
By Fetherstonhaugh & Co.
*ATTORNEYS*

Sept. 3, 1968 H. A. GRANT 3,400,279

VOLTAGE LEVEL SENSING CIRCUIT

Filed Sept. 3, 1965 2 Sheets-Sheet 2

INVENTOR
H. A. GRANT
BY Fetherstonhaugh & Co.
ATTORNEYS 3,400,279

VOLTAGE LEVEL SENSING CIRCUIT

Howard A. Grant, Pierrefonds, Quebec, Canada, assignor to Canadian Marconi Company, Montreal, Quebec, Canada Filed Sept. 3, 1965, Ser. No. 485,024
Claims priority, application Canada, Sept. 30, 1964, 912,923
2 Claims. (Cl. 307—235)

This invention is concerned with voltage level sensing circuitry and with the application thereof to analogue-to-digital converters. One application of the invention is in systems where information in digital form is converted to analogue form for economical transmission to a remote point whereat it is reconverted from analogue form by use of the invention to provide a display, again in digital form, as for instance that provided by a decade counter glow tube.

It is an aim of the invention to provide a semiconductor circuit arrangement adapted to provide a response only when an input signal applied thereto falls within a predetermined voltage interval.

It is a further aim of the invention to provide a voltage level sensing arrangement as aforesaid which, by connection in multiple to an ascending series of bias control potentials, are each adapted in response to predetermined input voltage levels to provide the necessary drive for the direct actuation of a glow type decade counter tube.

It is another aim of the invention to provide circuitry adapted for the purposes set forth in either of the two above paragraphs which is capable of production by techniques falling within the scope of such terms as "micro-miniaturization" and "integrated electronic circuits" and the like.

According to the invention I provide a voltage responsive circuit arrangement adapted to produce an output indicative of the fact that the level of a DC voltage signal applied as input thereto lies between two predetermined voltage limits said arrangement comprising a PNP transistor having emitter base and collector elements, means connecting said PNP transistor emitter element to a terminal adapted to be supplied with a potential equal to the more positive of said predetermined voltage limits load resistor means connecting said PNP transistor collector element to a terminal adapted for connection to a source of potential substantially more negative than the more negative of said predetermined voltage limits, resistor means connecting said PNP transistor base element to a terminal adapted for connection to a source of potential substantially more negative than the more negative of said predetermined voltage limits, an NPN transistor having emitter base and collector elements, means connecting said NPN transistor emitter element to a terminal adapted to be supplied with a potential equal to the more negative of said predetermined voltage limits, load resistor means connecting said NPN transistor collector element to a terminal adapted for connection to a source of potential substantially more positive than the more positive of said predetermined voltage limits, resistor means connecting said NPN transistor base element to a terminal adapted to be connected to a source of potential substantially more positive than the more positive of said predetermined voltage limits, an input terminal, a first diode having anode and cathode elements connected between said input terminal and said PNP transistor base element with the anode element of said first diode connected toward said input terminal and the cathode element of said first diode connected toward said PNP transistor base element, a second diode having anode and cathode elements connected between said input terminal and said NPN transistor base element with the cathode element of said second diode connected toward said input terminal and the anode element of said second diode connected toward said NPN transistor base element, a third diode having anode and cathode elements connected between the collector element of said PNP transistor and the base element of said NPN transistor with the cathode element of said third diode connected toward said PNP transistor collector element and the anode element of said third diode connected toward said NPN transistor base element, and an output terminal connected to the collector element of said NPN transistor.

The invention will be more particularly described and explained with reference to the accompanying drawings in which.

Figure 1:
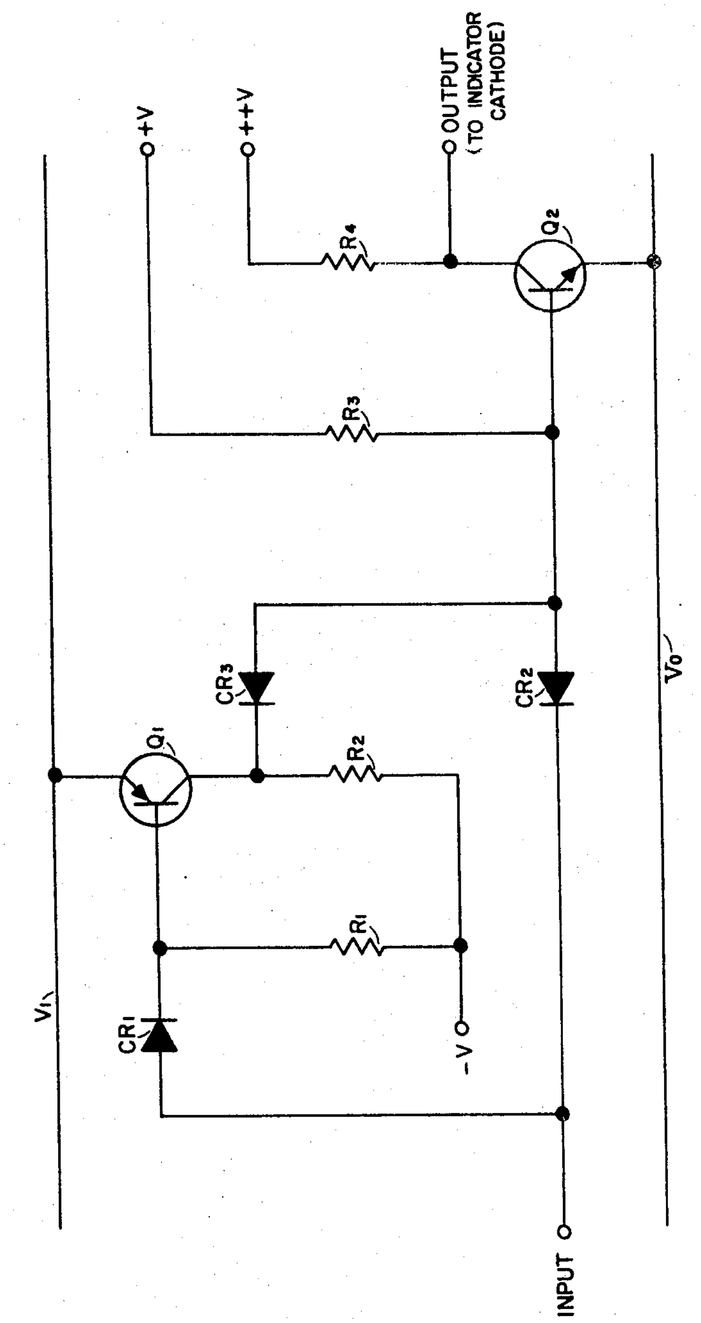
FIGURE 1 shows a preferred embodiment of the invention.

Referring to FIGURE 1 there is shown an arrangement which provides an output where the DC input voltage applied thereto is between the limits $v_0$ and $v_1$. $Q_1$ is a PNP transistor device with its collector connected through load resistor $R_2$ to a source of negative energizing potential $-V$. $Q_2$ is an NPN type of transistor device with its collector connected through load resistor $R_4$ to a source of positive energizing potential $++V$. The energizing potentials $+V$, $++V$, and $-V$ are appreciably greater than the upper and lower limits of the input signal voltage to be sensed. Bias is applied through isolating resistors $R_1$ and $R_3$ respectively to the bases of $Q_1$ and $Q_2$ to render them normally conducting. As shown $R_1$ is connected from the base of $Q_1$ to $-V$ and $R_2$ from the base of $Q_2$ to $+V$, but it will be evident, from the operation of the circuit as discussed below that other sources of appropriate bias potentials could be used if desired, that is $R_1$ and $R_2$ need not be connected to the same source, or $R_3$ and $R_4$ could be connected to a common source. The emitter of $Q_1$ is connected to a source of potential equal to the upper limit $v_1$ of desired voltage level indication. The emitter of $Q_2$ is connected to a source of reference potential equal to the lower limit $v_0$ of desired voltage level indication. The input signal a variable DC voltage is applied through the oppositely poled diode devices $CR_1$ and $CR_2$ to the bases of $Q_1$ and $Q_2$ while diode device $CR_3$, poled as shown, connects the emitter of $Q_1$ to the base of $Q_2$. Output from the arrangement is taken from the collector of $Q_2$.

The functioning of the circuit of FIGURE 1 is as follows:

When the input voltage is less than $v_0$ transistor $Q_2$ is cut off by the application of potential $v_0$ to its base through $CR_2$, and $Q_1$ is conducting but isolated from $Q_2$ by $CR_3$ which under these conditions is back biased. When the input voltage rises to between $v_0$ and $v_1$ the voltage on the base of $Q_2$ rises above that of its emitter and $Q_2$ conducts developing an output signal across $R_4$. $Q_1$ remains conducting but isolated from $Q_2$ by $CR_3$.

When the input voltage rises above $v_1$, $Q_1$ stops conducting and its collector voltage drops towards $-V$ thus rendering $CR_3$ conductive and providing a path from the base of $Q_2$ to $-V$. $Q_2$ therefore is now cut off and provides no output.

To enable an appreciation of the circuit parameters appropriate for the circuit of FIGURE 1 the following tabulation is given for the case of the application of the invention in a driving circuit for a glow tube type of decade counter. It will be appreciated that the values here given are illustrative only of one application of the invention and are in no way intended to be limiting.

| | |
|---|---|
| $Q_1$ | type 2N404. |
| $Q_2$ | type 2N1310. |
| $CR_1$, $CR_2$, $CR_3$ | type 1N277. |
| V++ | +170 volts. |
| V+ | +12 volts. |
| V− | −12 volts. |
| $v_1 - v_0$ | Greater than about 0.7 volt. |
| $R_1$ | 100,000 ohms. |
| $R_2$ | 56,000 ohms. |
| $R_3$ | 56,000 ohms. |
| $R_4$ | 1.5 megohms. |

It will be evident that if another set of circuit elements as shown in the figure is connected in cascade therewith, namely with the new $Q_2$ emitter connected to $v_1$ and the new $Q_1$ emitter to a higher reference voltage, $v_2$ and with the supply voltages +V and −V and the input signal terminals in common to the two sets of circuits, the first or original circuit representing the count 0 say, will provide an output only when the input signal level is between $v_0$ and $v_1$, and, as the input level rises above $v_1$, output from circuit 0 will cease and output from circuit 1 will be initiated and be maintained so long as the input signal level is between $v_1$ and $v_2$. This cascading process may be continued, and using circuit elements as above tabulated a decade range of input voltage level to individual driving outputs is obtained. The biasing potentials $v_0$, $v_1$, $v_2$ etc. are readily obtained from a tapped potentiometer fed from the energizing voltage supply or otherwise as desired. No particular precautions are necessary with regard to regulation of the reference voltage supply.

Figure 2:
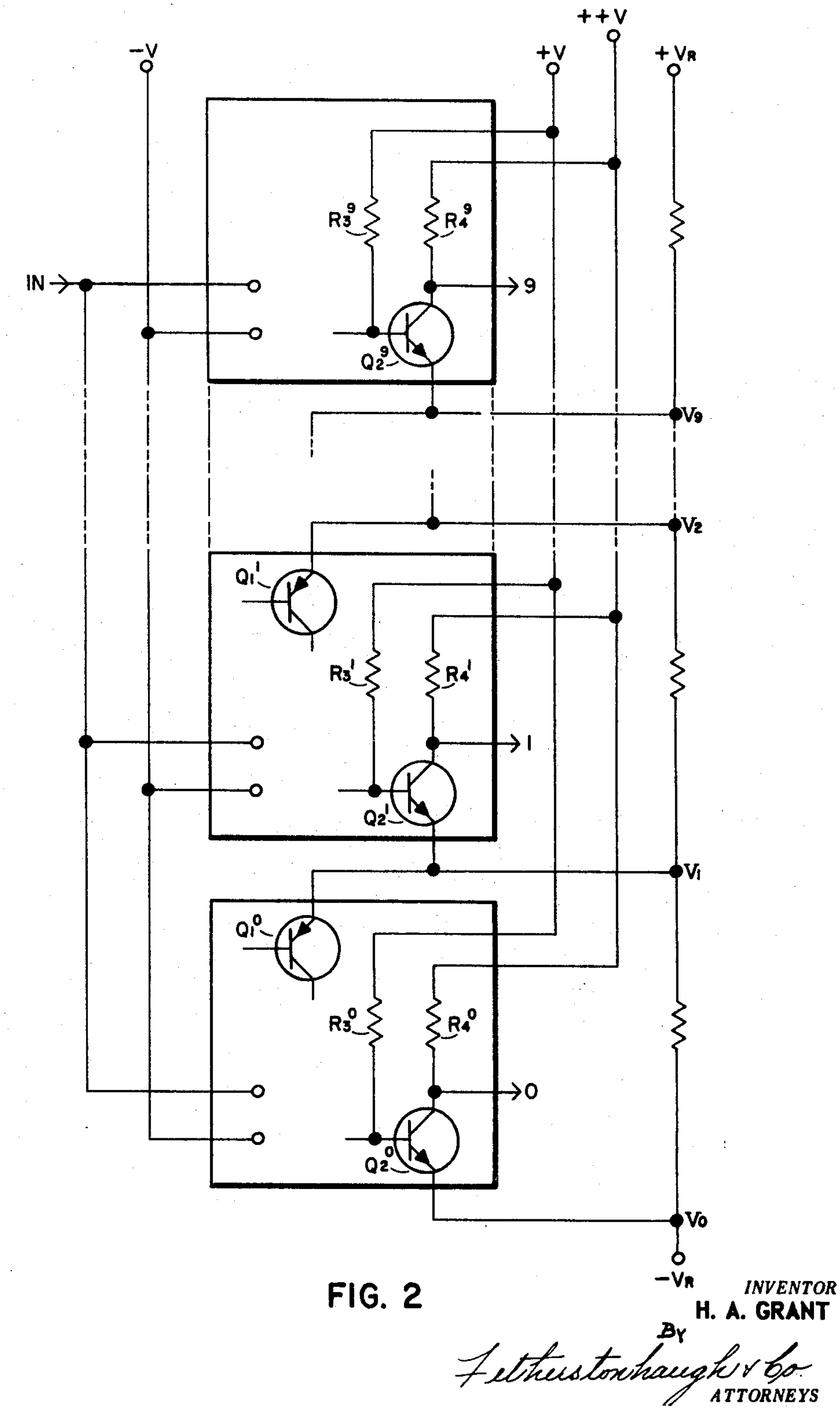
FIGURE 2 shows how multiple units in accordance with the invention may be interconnected to constitute an analogue to digital converter capable of driving a glow tube type of decade counter.

The foregoing embodiment of the invention is illustrated in FIGURE 2 where the plurality of circuits of FIGURE 1 are shown in partial block diagram form. It is believed that FIGURE 2 is self-explanatory, but reference may be made to the fact that the two positive potential sources shown for the transistors $Q_2$ in conjunction with the use of a high voltage transistor such as the type 2N1310, provides for direct drive of a counter tube such as that known under the registered trade name "Nixie." As shown in FIGURE 2 the last of the series of circuits, number 9 in this case, omits $Q_1$ and its associated circuitry since in this type of application the input signal increase terminates after passing the reference potential $v_9$.

From a consideration of the figures it will be seen that the invention is well adapted for manufacture using so-called "integrated electronic" techniques since no reactive elements such as capacitors or inductors are used. The function of the diode devices may be performed by diode-connected transistors as is well known in the art.

It will further be obvious that a low voltage, low powered transistor could be used for $Q_2$ and the output thereof applied as a control signal to a power amplifier operating, say a synchro device.

I claim:

1. A voltage responsive circuit arrangement adapted to produce an output indicative of the fact that the level of a DC voltage signal applied as input thereto lies between two predetermined voltage limits, said arrangement comprising a PNP transistor having emitter base and collector elements, means connecting said PNP transistor emitter element to a terminal adapted to be supplied with a potential equal to the more positive of said predetermined voltage limits, load resistor means connecting said PNP transistor collector element to a terminal adapted for connection to a source of potential substantially more negative than the more negative of said predetermined voltage limits, resistor means connecting said PNP transistor base element to a terminal adapted for connection to a source of potential substantially more negative than the more negative of said predetermined voltage limits, an NPN transistor having emitter base and collector elements, means connecting said NPN transistor emitter element to a terminal adapted to be supplied with a potential equal to the more negative of said predetermined voltage limits, load resistor means connecting said NPN transistor collector element to a terminal adapted for connection to a source of potential substantially more positive than the more positive of said predetermined voltage limits, resistor means connecting said NPN transistor base element to a terminal adapted to be connected to a source of potential substantially more positive than the more positive of said predetermined voltage limits, an input terminal, a first diode having anode and cathode elements connected between said input terminal and said PNP transistor base element with the anode element of said first diode connected toward said input terminal and the cathode element of said first diode connected toward said PNP transistor base element, a second diode having anode and cathode elements connected between said input terminal and said NPN transistor base element with the cathode element of said second diode connected toward said input terminal and the anode element of said second diode connected toward said NPN transistor base element, a third diode having anode and cathode elements connected between the collector element of said PNP transistor and the base element of said NPN transistor with the cathode element of said third diode connected toward said PNP transistor collector element and the anode element of said third diode connected toward said NPN transistor base element and an output terminal connected to the collector element of said NPN transistor.

2. A plurality of circuit arrangements as claimed in claim 1 arranged in an ascending series of stages each comprising a said circuit arrangement with the emitter of each PNP transistor in one stage connected to the emitter of the NPN transistor of the following stage the plurality of the emitter to emitter junctions so formed being connected in order to a series of reference potential sources arranged in ascending order, means connecting the inputs of each stage in parallel, means to apply energizing and biasing potentials to said stages, and separate output connections to each of said stages.

References Cited

UNITED STATES PATENTS 3,041,469 6/1962 Ross ............ 307—318 X

JOHN S. HEYMAN, *Primary Examiner.*